Figure 1:
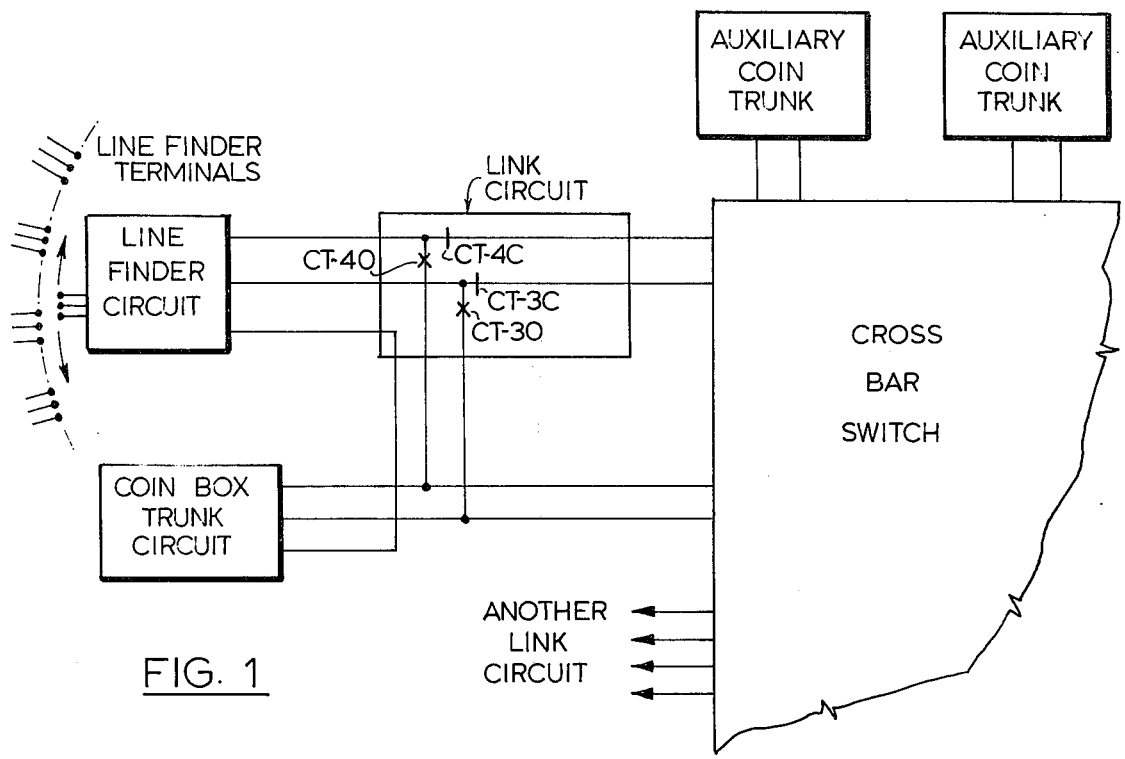

United States Patent [19]
DeGraauw et al.

[11] 3,947,643
[45] Mar. 30, 1976

[54] METHOD OF PROVIDING DIALTONE FIRST ON STEP BY STEP TELEPHONE SYSTEMS

[75] Inventors: Henk Anthony DeGraauw, Bramalea; Ramaswami Bashyam, Brampton, both of Canada

[73] Assignee: Northern Electric Company Limited, Montreal, Canada

[22] Filed: Oct. 2, 1974

[21] Appl. No.: 511,362

[52] U.S. Cl. .............................................. 179/6.3 R
[51] Int. Cl.² ........................................... H04M 17/00
[58] Field of Search ..... 179/6.3, 18 D, 18 DA, 17 C, 179/6.5

[56] References Cited
UNITED STATES PATENTS

| | | | |
|---|---|---|---|
| 3,456,081 | 7/1969 | Pharis et al. | 179/6.3 R |
| 3,579,253 | 5/1971 | Edington | 179/6.3 R |
| 3,601,541 | 8/1971 | Thompson | 179/6.3 R |
| 3,676,597 | 7/1972 | Peterson | 179/6.3 R |
| 3,678,203 | 7/1972 | Lorange | 179/6.3 R |

*Primary Examiner*—Kathleen H. Claffy
*Assistant Examiner*—Gerald L. Brigance
*Attorney, Agent, or Firm*—Westell & Hanley

[57] ABSTRACT

A step by step central office serving coin box subsets is provided with a link circuit which on initiation of a call from the coin box sub-set connects the line finder circuit through an auxiliary coin trunk circuit to the central office equipment. This is performed whether or not a coin has been deposited at the coin box sub-set. When the user of the coin box sub-set dials the auxiliary coin trunk determines whether
  a. the call is charge or non-charge
  b. if the call is charge whether or not adequate coinage been deposited.

On this determination the auxiliary coin trunk is freed to serve another call. If the call is charge and adequate coinage has not been deposited the call is interupted by the link circuit. If the call is non-charge or adequate coinage has been deposited, the link circuit connects the line finder directly to central office equipment so the call may proceed.

9 Claims, 3 Drawing Figures

METHOD OF PROVIDING DIALTONE FIRST ON STEP BY STEP TELEPHONE SYSTEMS

This invention relates to circuitry facilitating the provision of 'dial tone first' telephone service, from pay stations.

The conventional arrangement for making calls from pay stations called herein 'coin box sub sets' involves insertion of a coin before any dialing is allowed to have any effect on the telephone network. This has caused inconvenience and had serious implications since the intending user of a telephone set without a coin could not make those calls which are normally 'no-charge' including service calls and 'operator' calls and could not even call the operator in case of emergency. Accordingly the trend has been to convert the telephone system to allow calls to be initiated from a pay sub-set without payment of a coin. For obvious reasons this is referred to as Dial Tone First or D.T.F. System. Such Dial Tone First System requires that a check be made first from the digits dialled to determine whether or not the call initiated is a 'charge' or a 'no charge' call, and second to determine, in the case of charge calls, the presence of adequate coinage and to initiate the necessary steps to prevent the completion of a call where the call from the coin box sub set is of a charge nature and no money has been deposited.

Such coin check circuitry and resultant switching equipment represents an added expense and space at the central offices converted to Dial Tone First (D.T.F. for brevity). This presents a particular problem with step-by-step central offices, wherein the lack of common control equipment for the incoming lines tends to require coin check and control equipment for each coin box trunk.

The object of the invention is to reduce the numbers of coin check and control equipment required for a step-by-step central office equipped with dial tone first for coin box sub sets.

Another object of the invention is to provide circuitry for use with a step-by-step central office which allows coin checking and the control of equipment to be shared by a number of the coin box trunks.

The following terms are used herein with the following connotations:

A subscriber's line comprising 'T' and 'R' or 'Tip' and 'Ring' leads, connects a subset to central office. As is well known the connection from the subscriber's line to central office involves a line finder which, on location of the subscriber's line awaiting service extends the connection from the coin box sub set to the central office equipment. In the extension of such connection the tip and ring or 'T' and 'R' leads referred to will be accompanied by a sleeve or 'S' lead. Thus reference in the application to extension of a connection will imply extension not only of the 'T' and 'R' leads but where now conventionally used the extension of the sleeve lead also.

The subsets with which this invention are concerned have coin boxes in which coins are deposited in payment for 'charge' calls and are referred to herein as coin box sub-sets.

A trunk circuit normally extends the connection from the sub-set through a line finder to step-by-step control office switching equipment. Where the trunk and the connected line finder are to be used with lines from coin box sub-sets, the trunk is referred to as a coin box trunk circuit. The above definition is still applicable but this invention describes circuitry intermediate the line finder and the trunk circuit and carrying (or sometimes interrupting) the extended connection.

A line finder hunts among lines from sub-sets to locate a sub-set, in this case a coin sub-set, awaiting connection to a trunk and on such location extends the connection from the sub-set for connection to a trunk.

Under pre-existing step-by-step central office arrangements, the line finder is connected to the coin box trunk which the latter is conventionally provided with equipment connected to:

a. check for the presence of the adequate coin for a local call, b. be instrumental in collection of or the return of coins deposited if this is required.

The equipment described herein with the exception of the sub-set and the line therefrom is all located at central office and sometimes referred to as 'central office equipment'.

This invention provides a link circuit between the line finder and its associated coin box trunk. The link circuit is designed, when the line finder is connected to a subscriber's line (this will be a line to a coin box subset), to extend the connection originating with the coin box sub-set from the line finder to a circuit herein called an 'auxiliary coin trunk' and to provide a corresponding connection from the auxiliary coin trunk to the coin box trunk. The auxiliary coin trunk is designed to determine from the dial pulses corresponding to an initial sub-set of digits from the number dialed, whether the call is charge on non charge and to determine whether on not a coin is present. Where the auxiliary coin trunk contemporaneously determines that a charge call is being made and that no coin is present it is designed to prevent the completion of a call and preferably to signal the subscriber by tone or announcement, and in the event of a no charge call to allow the call to complete in a normal manner. The link is designed, in combination with the link circuit, to remove the auxiliary coin trunk from the circuit in coin present or no charge situations so that the link then connects the line finder directly to the coin box trunk. (It will be noted that, while the auxiliary coin trunk is making the above described determinations, it extends the sub-set connection through its circuitry from the link, back through the link and thereby to the coin box trunk. Thus the initial digits in the set of dialed digits are not only detected by the auxiliary coin trunk but are also passed on to the coin box trunk along with the succeeding dialed digits for processing a proper call.)

It is an advantage of the inventive circuit that the new equipment, added to convert the step-by-step office to DTF is achieved with substantially no modification of existing equipment. The coin box trunk is altered to remove its coin presence check function but the remainder of the circuit, including the coin return and coin collect functions remain unchanged.

However the main advantage of the novel link circuit is that it allows one or a small group of auxiliary coin trunks (which tend to contain the more expensive equipment) to serve a larger number or larger group of coin box trunks. The circuit is designed to take advantage of the fact that the checking of the first three or four digits of a dialed number is all that is required to determine charge or no charge and that after this and the coin presence check is completed, the auxiliary coin trunk may be freed to service other coin box trunks. The result of the use of the link circuit is therefore, that the number of auxiliary trunk circuits may, in a step-by-step central office be much less that the number of coin box trunks with the consequent saving in expense and space.

The link circuit is also preferably designed to provide means for sending a signal to the line finder and associated equipment beyond, if the operator of the coin box sub-set is too slow in dialling, takes too long between dialling consecutive ones of an initial set of the called number digits, or takes too long to hang up after receiving a disconnect tone. The object of sending such signal is to cause disconnection of the subscriber's line from the line finder, freeing the latter for servicing other lines. The circuit to be operated by the signal is sometimes referred to as a line lock-out circuit.

Figure 3:
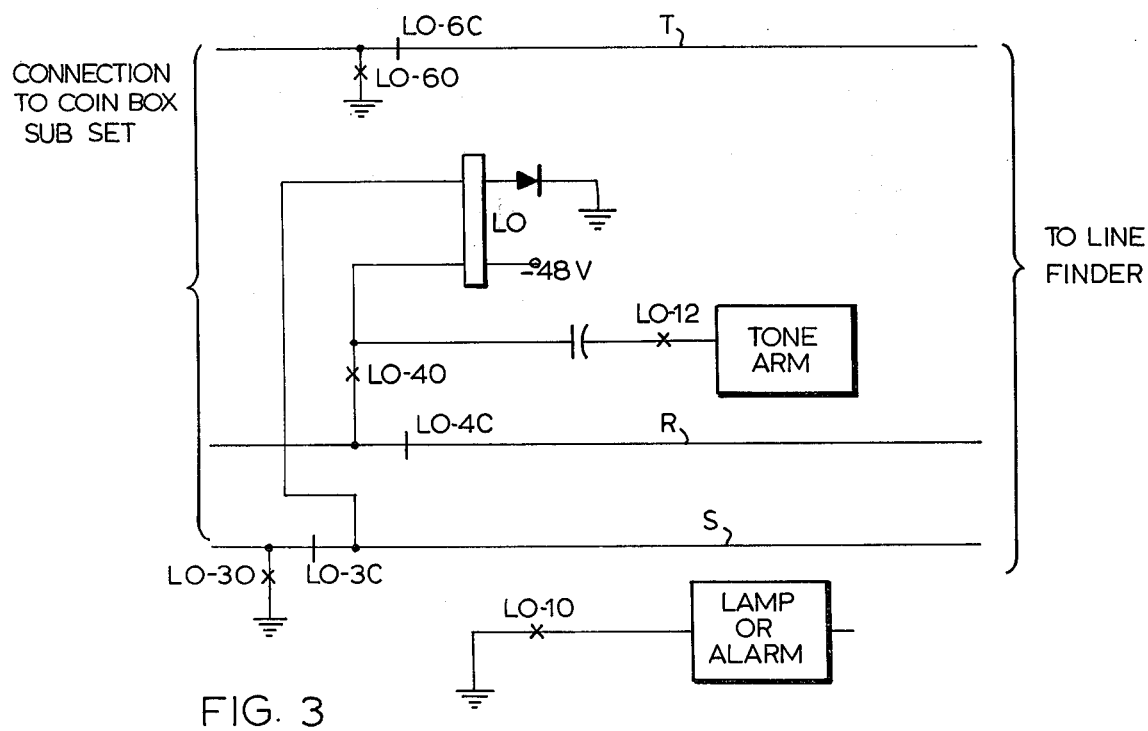
Figure 2:
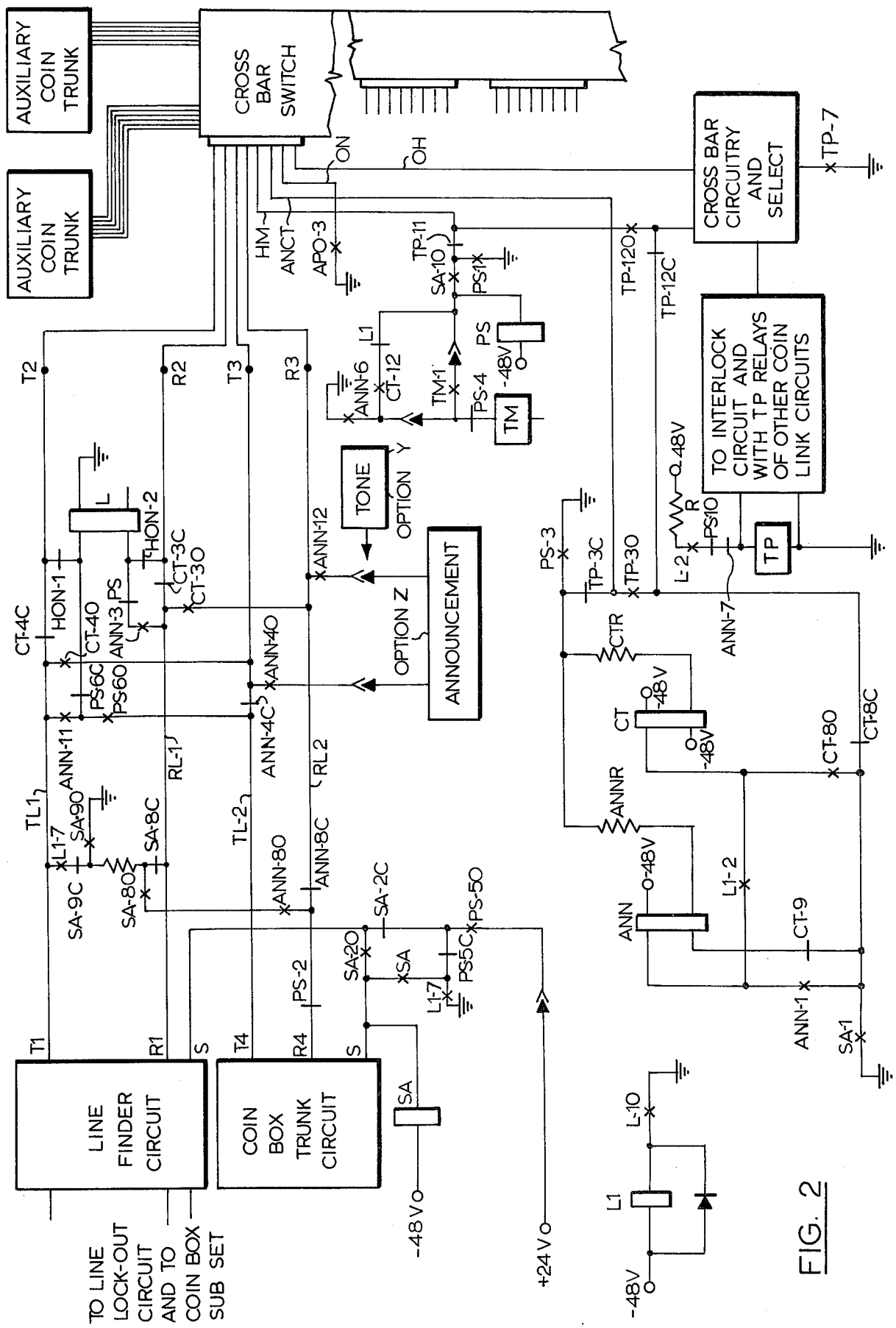

In drawings which illustrate a preferred embodiment of the invention:

FIG. 1 shows, in block form, the arrangement in operation of the main parts of the circuit, FIG. 2 shows the link circuit in detail, and FIG. 3 shows the line lock-out circuit.

The convention used for relay contacts in the drawings is that a contact, (e.g. CT-40) which is open when the relay is released (i.e. not operated) is shown as an 'X' across the interrupted line while a contact (e.g. CT-4C) which is closed when the relay is released is shown as a bar on the line which will be interrupted when the relay is operated.

As shown in FIG. 1, initially, the coin box sub-set going off hook causes the line finder to locate and achieve connection to the line to the coin box sub-set. In accord with well known telephone design techniques, such connection results in the extension of the subscriber's connection through the line finder. As will be later explained in detail the inventive link circuit then (initially) causes the extension of this subscriber's connection from the line finder, through the link, to a cross-bar switch to (and through) a circuit for determining coin presence or absence and whether the call is 'charge' or 'non-charge'. This circuit is designated an auxiliary coin trunk circuit. The link circuit further is designed to extend the subscriber's connection from the auxiliary coin trunk circuit, through the link circuit again to the coin box trunk circuit. Connection of the auxiliary coin trunk circuit as part of the subscriber's connection, results in dial tone being sent to the subscriber at the coin box sub-set. As a result the subscriber will normally commence dialling. The auxiliary coin trunk circuit is designed so that, by the time an initial set of digits of the called number (three in most telephone systems) have been dialled from this sub-set, the checking circuits in the auxiliary coin trunk have determined whether the call is a 'charge' call or not and whether or not there is a coin present. In the event that the auxiliary coin circuit determined that there is a coin present or that it is a no charge call, the link circuit is caused to operate relay CT, closing CT-30, CT-40 and opening CT-3C, CT-4C to switch the subscriber's extended connection through the line finder directly to the coin box trunk and taking the auxiliary coin trunk out of the circuit freeing it at the cross bar switch for use with another link circuit and line finder. If, with the circuit arranged as shown in FIG. 1, the auxiliary coin trunk determines that the call is a charge call and that no coin is present, then the link and associated circuitry is designed, on actuation by the connected auxiliary coin trunk, to cause disconnection of the line finder and hence, the coin box sub-set and subscriber's line from both the coin box trunk and from the auxiliary coin trunk, freeing the latter at the cross-bar switch for connection to another link circuit. The link also in the last event preferably acts to connect an announcement or tone to the subscriber's line. To each link circuit there corresponds (or vice versa) a line finder and a coin box trunk. Although not intended to be limiting, it is contemplated that, commonly, 80 link circuits be each arranged for selective connection, via a cross-bar switch to one of 10 auxiliary coin trunks.

In the preferred embodiment, there is also described lock-out circuitry whereby, with a coin box sub-set connected to an auxiliary coin trunk, in the event of a pause in dialling or the existence of a permanent tone for longer than a predetermined period, to open line between the central office equipment described and the coin box sub-set. The result is that a subscriber who does not commence dialling within a reasonable time, does not dial consecutive digits within a reasonable time of each other or does not hang up within a reasonable time of receiving a disconnect tone, has his coin box sub-set disconnected. This disconnection frees the central office equipment for use by other subscribers and thus avoides the needless tying up of telephone equipment.

In FIG. 2 where the link circuit is shown in detail, the line finder terminals T1, R1 (which represent points on the extension of the subscriber's line through the line finder) are connected by lines TL1 and RL1, respectively, to the appropriate terminals T2 and R2 on the cross-bar switch for connection to a selected auxiliary coin trunk as determined by a selection circuit associated with the cross-bar switch. The selection circuitry and the cross-bar switch are not shown as they represent known technology easily available to those skilled in the art. Selection circuitry and the crossbar switch are shown in U.S. Pat. No. 2,585,904 which was issued Feb. 19, 1952, A. J. Busch.

The cross-bar switch is designed so that: connection of lines TL1 and RL1 therethrough to corresponding lines in the auxiliary coin trunk is coupled with connection of T and R lines (not shown) from the output of the auxiliary coin trunk circuit through connections on the cross-bar switch (ganged with those for TL1 and RL1 to terminals T3 and R3 in the link circuit, and therefrom along lines TL2 and RL2 to terminals T4 and R4 of the coin box trunk circuit. The connections and relays are as shown.

The auxiliary coin trunk in addition to its coin check and digit analysis circuitry is designed to connect TL1 and RL1, respectively to TL2 and RL2 so that the circuitry of FIG. 2 in its initial status represents an extension of the subscriber's connection from the line finder, through the link, the auxiliary coin trunk, the link again to the coin box trunk (from where it will be extended to the switching equipment).

When a line is ready for service then, as is well known, a loop seizure is placed upon the line. The line finder then acts to extend such seizure to the coin link control circuit, the effect of such seizure on the equipment shown in the drawings is to place −48V on line TL1 and ground on path RL2.

Relays and switches are as shown in FIG. 2. Initially the contacts are in their closed or open position as shown, this circuit status connects lines TL1, RL1, TL2, RL2 to the cross-bar switch.

The ganged terminals of the cross-bar switch in closing effect closure of the leads HM, ANCT, ON to cooperating equipment in the auxiliary coin trunk to the coin link circuit. Leads ON and OH effect the cross-bar switch connection to the auxiliary coin trunk.

Extension of the loop seizure into the coin link circuit places −48 Volts on the line TL1 and ground on line RL1, in accord with the well known operation of the line finder and associated circuitry, causing relay L in the coin link circuit to operate. Operation of relay L closes contacts L-2 (see lowest central portion of FIG. 2) and operates trunk preference relay TP. Operation of the TP relay causes operation of selection of a particular auxiliary coin trunk. Such selection grounds lead OH cause operation of the cross-bar switch in a manner to connect leads T2, R2, T3, R3, ON, HM, ANCT to corresponding leads in the selected auxiliary coin trunk. Such selection and the consequent operation of the cross-bar switch is well known to those skilled in the art as demonstrated in the Busch patent already referred. (It will be noted that FIG. 2 schematically indicates four link circuits (one shown in detail) connectable to two auxiliary coin trunks by the cross-bar switch.) The link circuit allows the reduction in the number of the latter. The actual numbers of link circuits and auxiliary coin trunks may, of course, vary widely. One of the preferred arrangements offers the facility of combining eighty link circuits (each one corresponding to a line finder and a coin box trunk circuit) with ten auxiliary coin trunks. Connection of the line finder circuit through the link circuit to the auxiliary coin trunk by the cross-bar circuitry and preference circuitry, through the wiring of the cross-bar switch, causes extension of the connection from T2 and R2 through the connected auxiliary coin trunk circuit to terminal T3, R3 and along lines TL2 and RL2 to terminals T4 and R4. Extension of the aforesaid connection to terminals T4 and R4 causes the coin box trunk, in accord with conventional and well known design to ground sleeve lead S, causing the operation of relay SA. Operation of relay SA operates a relay in the auxiliary coin circuit by placing ground on lead ANCT over contact SA-1, CT-8 C, TP-30 (TP being then operated) on lead ANCT. The connection of ground to lead ANCT readies the auxiliary coin link circuit to determine the character of the dialed digits as between charge and no charge calls and to determine the presence or absence of a coin. The coin presence check circuitry is disconnected in the coin box trunk circuit when the link circuit of this invention is used. Thus, independently of whether or not a coin is present in the coin box sub-set; under the subject dial tone first system, as soon as the above connection to T4 and R4 is made, dial tone is sent from the coin box trunk circuit through lines TL2 and RL2, the cross-bar switch, the auxiliary coin trunk, the cross-bar switch and lines TL1 and RL1 to the coin box sub-set. Dial tone is provided in accord with well known techniques and design in the coin box trunk. The receipt of dial tone by the user signals him to dial the digits of the number he desires to call.

As previously implied the auxiliary coin trunk circuit contains means to determine the character of the dialed digits as between charge and no charge calls and means to determine the presence or the absence of a coin. Such equipment is readily available and may be of conventional design and hence need not be described here. Conventionally no charge calls include:

a. those starting with O.
b. service codes having the digits X11 where X may be any digit from 1–9.
c. service codes having the digits 410X where X may be any digit.

In some system arrangements, such no charge calls include those starting with 1.

In any event, the circuitry may be designed to discriminate, as desired, and in accord with all well known techniques between any selected classes of digits for charge and no charge calls. (It being again noted that except for disconnection of the 'coin present' relay in the coin box trunk, this coin box trunk still performs coin collect and return functions). In the novel circuit the only friction shifted from the existing coin box trunk to the auxiliary coin trunk circuit is the check for the presence of the minimum coinage for a local call. Also the auxiliary coin trunk circuit is designed to perform the functions described at Pg. 8, lines 14–21.

Operation of the cross-bar switch to connect the link circuit to an auxiliary coin trunk is designed to open contacts HON-1 and HON-2 releasing relay L. The release of relay L causes the slow release of relay L1 through the opening of contacts L-10 but further releases relay TP by the opening of contacts L-2, returning the contacts of relay TP to the position shown in FIG. 2.

The auxiliary coin trunk circuit now connected to receive the dialed pulses is designed, in accord with well known techniques, to determine after the necessary number of the digits originally dialed (one to three in the no-charge classes outlined above) whether or not the call is in the 'no charge' class or not. If it is determined that a no charge call is being dialled, then the auxiliary coin trunk circuit is designed and connected to place ground on lead ANCT to the coin link circuit. Ground on link ANCT is applied over line AL, contacts TP-3C, resistance CTR to operate relay CT. Relay CT operated locks over CT-80, SA-1 to ground. CT operated, opens CT-4C and CT-3C and closes CT-40 and CT-30, disconnecting the auxiliary coin trunk circuit, so that subscriber connection at the line finder circuit is connected to the coin box trunk circuit bypassing the cross-bar switch an the auxiliary coin trunk. The auxiliary coin trunk is provided with control circuitry to then allow it to reset its circuitry ready for connection to another coin link circuit, and the cross-bar disconnects its former connection so that the auxiliary coin trunk is released for use with another link circuit and line finder.

Preferred design of the operation of the auxiliary coin trunk circuit provides for a check for the presence of a coin in the coin box sub-set in the interdigital pause following the first and following the third dialed digit. The result of determination by the auxiliary coin trunk that a coin is present will also be the switching of the link circuit to provide an extension of the subscriber's connection between the line finder and the coin box trunk circuit bypassing the cross-bar switch and the auxiliary coin trunk. The result of a determination that a coin is not present, together with a determination that it is a charged call is to cause the link circuit to interrupt the subscriber's connection to the coin box trunk, disconnecting the latter and a further result is the freeing of the auxiliary coin trunk circuit. Preferably a tone or announcement is sent to the subscriber to induce him to hang up. This preferred arrangement is noted to emphasize that the scope of the invention is intended to include the inventive link circuit as described and claimed, when combined with an auxiliary coin trunk, whether the coin check is made before or during the sending of dial tone or only after the last charge or no-charge determinant digit; the criteria for successful operation of the system including the inventive link circuit being that — the link is to bypass the auxiliary coin trunk and connect the extended subscriber's connection through the line finder to the coin box trunk circuit on either coin presence or determination of a no charge call and, on the other hand, to prevent the call proceeding in charge call situations where no coin has been deposited. It is noted however that performing the coin check between digits is considered to have an advantage over performing the coin check during intervals when the pulsing of digits can be or is taking place since contemporaneous pulsing of digits increases the statistical likelihood of an error in the coin check.

In the preferred embodiment the auxiliary coin trunk check circuit operates after the first and third digit. Where in the classes previously mentioned, of initial sets of digits for no charge calls, the coin check after the first digit determines coin present, the auxiliary coin trunk circuit is designed to ground the ANCT lead as in the 'no charge' determination to operate relay CT — as before, connecting the line finder circuit to the coin box trunk circuit at CT-40 and CT-30 bypassing the cross-bar switch and the auxiliary coin trunk. When the coin check after the first digit determines 'no coin present' then the auxiliary coin trunk circuit does not ground the ANCT lead but awaits the coin check after the third digit. As in the no-charge situation, the auxiliary coin trunk circuit is thus released after the initial dialed digits to serve an equivalent circuitry.

After the third digit, if the coin check shows coin present, then relay CT is operated as before (unless already operated because it was a no charge call). After the third digit, if the coin check shows no coin present (and it has been determined that it is a 'charge' call), the circuit acts to connect −48V to lead ANCT to operate relay ANN. ANN is operated over TP-3C, ANNR, relay ANN, CT-9 and SA-1 to ground. ANN then locks over ANN-1 and SA-1. Operating of relay CT opens contacts CT-4C, CT-3C to cause release of the auxiliary coin trunk circuit. ANN operating operates relay L over ANN-3, and ANN-11. L operating operates relay L1. L1 operating operates relay CT over L1-2, ANN-1 and SA-1. CT operates and opens leads TL2 and RL2 to the auxiliary coin trunk to cause its release as previously discussed (for use with another link and line finder).

The operation of relay ANN closed contacts ANN-40 and ANN-12 at the same time opening lines TL2 and RL2 at the contacts ANN-8C and ANN-40. If option Z is employed, then closure of ANN-40 and ANN-12 will place the chosen announcement across the line, TL-1 and RL1 over CT-40, CT-30 respectively, while if option Y is employed, tone is placed by tone supply Y on line RL2; (in either option) to indicate to the user that he should go on hook.

If the calling subscriber goes on-hook, this through the design of the coin box sub-set and the line finder causes L to release, which releases relay L1. The coin box trunk is designed to then apply a coin potential on T4 lead and then is designed to release relay SA by removing the ground on the S lead followed by the release of relays ANN and CT through the opening of contacts SA-1 returning this circuit to normal.

If, after receiving announcement or reorder tone, the calling subscriber does not go on-hook within a predetermined time, determined by timer TM (preferably approximately 27 seconds), TM operates its contacts. Timer TM may be of any design but it is preferred to use a thermal relay. The timing cycle is initiated by the closure of contacts ANN-6.

When relay TM operates, contacts TM-1 close causing the operation of relay PS which then locks over its own contact PS-1 (with the subscriber off-hook SA is still operated). The operation of relay PS opens at PS-2, the RL1 lead to the coin box trunk circuit and the coin box trunk is designed to treat this as a disconnect signal. Closure of contacts PS-3 holds ANN and CT relays operated during the release functions of the auxiliary trunk. Relay PS operating further releases thermal timer TM by opening contacts PS-4 Contact PS-50 closes to connect +24 volts to the then open contacts SA-2C. When the disconnect signal is indicated to the coin box trunk circuit, by the opening of contacts PS-2, the latter in accord with well known design applies the coin return or collect potential on TL-2 lead over PS-60, ANN-11 then TL-1 lead to return or collect (in accord with well known criteria unconnected to the invention) the coin in the coin box. Also the coin box trunk circuit is designed to release relay SA which releases relay CT by the opening of contacts SA-1. Release of relay CT closes contacts CT-3C and CT-4C and the lines TL1-RL1 are prepared on the initiation of a new connection to the line finder, to connect the latter to an auxiliary coin trunk to process another call.

Release of relay SA also opens the circuit at SA-10 to cause the release of relay PS. PS is therefore designed for slow release sufficient that PS-50 remains closed long enough after the closure of contacts SA-2C to allow the +24 volts to be sent to the sleeve lead of the line finder to operate a lock-out circuit to be described.

The above description covers the situations where the calling subscriber goes on hook or does not go on hook after it has been determined that there is a charge cell with no or insufficient coin present.

If the calling subscriber does not dial his first digit within 25 seconds from the time he goes off-hook or if he takes more than 25 seconds between the 1st and 2nd or between the 2nd and 3rd digits, the auxiliary coin trunk is designed to measure such time span and consequent on such measurement, to operate a relay and as a result ground is extended over lead HM to the link circuit to operate relay PS over TP-11, SA-10 (SA not yet released in the situation where the subscriber has not gone on hook nor has the thermal relay TM timed out).

Relay PS operated, opens lead RL2 at PS-2 to the coin box trunk circuit which acts as a disconnect signal to the circuit. Relay PS operated also operates relay CT which opens lines TL1 and RL1 (at CT-4C and CT-3C) to the auxiliary coin trunk to release it and PS operating also connects 24 volts to the sleeve lead of the line finder over PS-50. The opening of the lead RL2 at PS-2 is interpreted by the coin box trunk as an abandoned call. The coin box trunk as previously described, is designed as result to return or collect the coin in the coin box. The trunk is also designed to release relay SA which releases relay CT (as previously described in connection with the operation of relay TM) and slow release relay PS. As previously described the +24V signal is now applied on the sleeve lead to the line finder during the release time of PS relay to operate a relay in the lock out circuit.

There has thus been described circuitry whereby a coin box sub-set may complete a call without a coin. The link circuit described herein contributes by initially directing the coin box sub-set connection through an auxiliary coin box trunk which determines either:

1. that the call is a no charge call or is a charge call and a coin has been deposited,
2. that the call is a charge call and no coin has been deposited, In the first event the link circuit acts to connect the coin box sub-set directly to the coin box trunk circuit freeing the more expensive auxiliary coin trunk for service on another call.

In the second event the link circuit acts to send disconnect tone or an announcement to the caller and to free the auxiliary coin trunk for service or another call.

Thus in either event the link circuit allows the auxiliary coin trunk to be used but to be tied up for only a very short period, the period for dialling a first few of the digits in the called number.

As preferably provided and as shown in the specific embodiment, the link circuit preferably provides means, at the actuation of the auxiliary coin box trunk to send a signal to the line finder, in the event that 1. The calling subscriber does not dial his first digit within a predetermined time of when he goes off hook, or
2. The calling subscriber takes too long between any consecutive ones of those digits which are processed by the auxiliary coin trunk circuit in assessing whether or not it is a no charge call. The link circuit also preferably provides means to send a similar signal to the line finder in the event that the calling subscriber does not hang up within a predetermined time after receiving disconnect tone.

The signals sent in either case to the line finder are used to lock out the subscriber's line as shown in FIG. 3.

As implied by the dotted lines across the Line Finder circuit in FIG. 1, during the connection of a subscriber to the link circuitry, the TR and S leads are connected (ganged) through the line finder and to corresponding lines between the coin box sub-set lines and the line finder terminals. The terminals of FIG. 3 are shown in their position when the coin box is not in use and during its normal usage. However when +24 volts is placed on the line finder sleeve lead during the contemporaneous closure of contacts SA-2C and PS-50 (FIG. 2), this +24 V potential, applied on the sleeve lead through the line finder to the circuitry of FIG. 3 operates relay LO between the sleeve lead and ground. Operation of the relay LO openns the lines T and R at LO-4C and LO-6C. The result of open lines T and R looks to the line finder like a disconnect signal and results in the line finder freeing itself to service another subscriber's line. As a result the line finder and associated equipment are not unduly tied up when the subscriber takes too long to dial, does not dial or does not hang up.

It is noted that the relay LO in operating locks over LO-40 to the R lead to the sub-set which is grounded when the sub-set is off hook. Closure of contacts LO-10 is designed to make signal or announcement at central office that the lock-out or off-hook condition exists on the subscriber's line. Closure of contacts LO-12 may be used to provide a tone to the sub-set. When The sub-set in question goes on hook, the ground connection to the R lead is removed releasing relay LO and leaving it in the state shown in the drawings.

I claim:

1. For a step by step central office having connecting lines from sub-sets including coin box sub-sets, coin box trunk circuits for connecting to coin box sub-sets and a line finder corresponding to a coin box trunk circuit for locating the line from such a coin box sub-set when the coin box sub-set goes off-hook, and for connecting to said coin box sub-set line to extend the sub-set connection; the improvement of providing a link circuit for connecting said connected line finder circuit to said coin box trunk, said link circuit being designed at the initiation of a call to extend the connection between the sub-set and said connected line finder to said coin box trunk through an auxiliary coin trunk circuit designed to determine from the initial digits originating with the coin box sub-set whether the call initiated at said sub-set comes within a class of no charge calls, means in said link circuit responsive to a signal from the auxiliary coin trunk circuit consequent on a determination that said call comes within the class of no charge calls, for extending the connection from said connected line finder to said coin box trunk, so as to bypass said auxiliary coin trunk circuit.

2. For a step by step central office, as claimed in claim 1, means responsive to said signal consequent on a determination that said call comes within the class of no charge calls, to release said auxiliary coin trunk circuit, whereby said auxiliary coin trunk circuit is available for connection to another link circuit.

3. For a step by step central office as claimed in claim 1 including means in said link circuit responsive to a determination that a call is in the class of charge calls and that there is no coin present for interrupting the connection between said detecting circuit and said coin box trunk circuit.

4. A link circuit designed for use with a step-by-step central office to extend a connection via a coin box sub-set from a line finder to a central office trunk through an auxiliary con call testing circuit designed for use with said link circuit and with similar link circuits, said link circuit being designed on the extension thereto of a connection from a coin box sub-set via a line finder to extend the connection to said auxiliary coin call testing circuit and to extend a corresponding connection from said auxiliary circuit to said trunk, means responsive to the tests made in said auxiliary coin call testing circuit to connect the subscriber's line directly to the trunk bypassing said auxiliary coin call testing or to prevent completion of the subscriber's call.

5. A link circuit as claimed in claim 4, and means, responsive to the tests made in said auxiliary coin call testing circuit, to release said auxiliary circuit, whereby said auxiliary coin call testing circuit is available for connection to another link circuit.

6. For a step by step central office having connecting lines from subsets including coin box sub-sets, coin box trunk circuits for connection to coin box sub-sets and a line finder corresponding to a coin box trunk circuit for locating the line from such a coin box sub-set when the coin box sub-set goes off hook, and for connecting to said coin box sub-set line to extend the subset connection; the improvement of providing a link circuit for further extending the line connection from the line finder circuit to the corresponding coin box trunk, said link circuit being designed at the initiation of a call to extend such connection from said connected line finder to the corresponding coin box trunk through a circuit designed to detect an initial set of digits transmitted from said coin box sub-sets, means in said link circuit, responsive to a signal from said detection circuit, to provide an extension of said connection from said line finder to said corresponding coin box trunk circuit, and to release said detection circuit, whereby said detection circuit is available for connection to another link circuit 7. For a step by step central office as claimed in claim 6, including means in said link circuit responsive to receipt of a second signal from said detection circuit, to open said extended connection between said detection circuit and said trunk circuit.

8. For a step by step central office having connecting lines from sub-sets including coin box sub-sets, coin box trunk circuits for connection to coin box sub-sets and a line finder corresponding to a coin box trunk circuit for locating the line from such a coin box sub-set when the coin box sub-set goes of hook, and for connecting the to said coin box sub-set line to extend the subset connection; the improvement of providing a link circuit for further extending the line connection from said connected line finder circuit to the corresponding coin box trunk, said link circuit being designed at the initiation of a call to extend the said connection from said connected line finder to a circuit designed to detect an initial set of digits transmitted from said coin box sub-set; and to create a corresponding connection between said detection circuit and said corresponding coin box trunk circuit, means in said link circuit, responsive to a signal from said detection circuit, to provide an extension of said connection from said line finder to said corresponding coin box trunk circuit, and to release said detection circuit whereby said detection circuit is available for connection to another link circuit 9. For a step by step central office as claimed in claim 8, including means in said link circuit responsive to receipt of a second signal from said detection circuit, to open said extended connection between said detection circuit and said trunk circuit.

* * * * *

UNITED STATES PATENT AND TRADEMARK OFFICE
CERTIFICATE OF CORRECTION

PATENT NO. : 3,947,643
DATED : March 30, 1976
INVENTOR(S) : HENK ANTHONY DeGRAAUW & RAMASWAMI BASHYAM It is certified that error appears in the above—identified patent and that said Letters Patent are hereby corrected as shown below:

Claim 8 line 7 delete "the", first occurrence.

Signed and Sealed this

Thirteenth Day of December 1977

[SEAL]

Attest:

RUTH C. MASON
*Attesting Officer*

LUTRELLE F. PARKER
*Acting Commissioner of Patents and Trademarks*